METHOD AND APPARATUS FOR ACCELERATION OF CHARGED PARTICLES USING A LOW VOLTAGE DIRECT CURRENT SUPPLIES
Filed Aug. 20, 1962 13 Sheets-Sheet 1

INVENTOR
James T. Serduke
BY
Alfons Puishes
ATTORNEY

INVENTOR.
James T. Serduke
BY
Attorney

INVENTOR.
JAMES T SERDUKE
BY Alfons Puishes
ATTORNEY

INVENTOR
James T. Serduke
BY
Alfons Puishes
ATTORNEY

INVENTOR

James T. Serduke

BY [signature]

ATTORNEY

INVENTOR
James T. Serduke

BY Alfons Puishes
ATTORNEY

METHOD AND APPARATUS FOR ACCELERATION OF CHARGED PARTICLES USING A LOW VOLTAGE DIRECT CURRENT SUPPLIES

Filed Aug. 20, 1962 13 Sheets-Sheet 7

INVENTOR
James T. Serduke
BY
ATTORNEY

INVENTOR
James T. Serduke
BY Alfons Puishes
ATTORNEY

Nov. 16, 1965 J. T. SERDUKE 3,218,562

METHOD AND APPARATUS FOR ACCELERATION OF CHARGED PARTICLES USING A LOW VOLTAGE DIRECT CURRENT SUPPLIES

Filed Aug. 20, 1962 13 Sheets-Sheet 9

INVENTOR
James T. Serduke

BY Alfons Puishes

ATTORNEY

METHOD AND APPARATUS FOR ACCELERATION OF CHARGED PARTICLES USING A LOW VOLTAGE DIRECT CURRENT SUPPLIES

Filed Aug. 20, 1962 13 Sheets-Sheet 10

INVENTOR
James T. Serduke

BY [signature]

ATTORNEY

INVENTOR
James T. Serduke
BY [signature]
ATTORNEY

Nov. 16, 1965 J. T. SERDUKE 3,218,562

METHOD AND APPARATUS FOR ACCELERATION OF CHARGED PARTICLES USING A LOW VOLTAGE DIRECT CURRENT SUPPLIES

Filed Aug. 20, 1962 13 Sheets-Sheet 12

INVENTOR
James T. Serduke

INVENTOR
James T. Serduke

United States Patent Office 3,218,562
Patented Nov. 16, 1965

3,218,562
METHOD AND APPARATUS FOR ACCELERATION OF CHARGED PARTICLES USING A LOW VOLTAGE DIRECT CURRENT SUPPLIES

James T. Serduke, 925 Avis Drive, El Cerrito, Calif.
Filed Aug. 20, 1962, Ser. No. 218,175
15 Claims. (Cl. 328—233)

This application is a continuation-in-part of the co-pending application Serial No. 820,050, filed June 12, 1959, now abandoned.

This invention is a method and apparatus for the acceleration of charged particles in which direct current accelerating potentials are used exclusively. The apparatus herein described is referred to as the "D.C.-Tron" and the method as the "D.C.-Tron method."

The invention is equally applicable to charged particle accelerators of the linear type and to those in which the particles follow arcuate orbits, curvilinear trajectories, or a combination of the two.

All existing high energy charged particle accelerators, whether of the linear or arcuate orbit type, employ high frequency oscillating electrical accelerating fields in combination with various arrangements and configurations of focussing or directing magnetic fields to produce the desired acceleration of the particles and their direction, whether the latter be electrons, protons, deuterons or other ions. All existing high energy charged particle accelerators have the disadvantages inherent in the use of high frequency accelerating electric fields requiring the synchronization of the frequency of the electric fields with the motion of the particles, plus many other disadvantages with regard to successful particle acceleration. Among these are the need for heavy and costly magnets, wave guides, Klystrons and their attendant power supplies and structures. Typical of these types are the cyclotron, bevatron, synchroton, Cockcroft-Walton, Van de Graaf, and others well-known to those skilled in the art.

Devices have been previously proposed for the acceleration of charged particles with the aid of direct current. One of these is the "High Frequency Apparatus" of Blewett described in U.S. Patent No. 2,366,556. This utilizes a combination of alternating current and direct current. The acceleration across gaps is accomplished by the action of alternating current which Blewett himself calls a "modulating gap." Blewett further described the operation of his device as follows:

"For the case illustrated, it is assumed that the frequency of potential variation across the gap is such that eight complete cycles of variation occur during the time required for a single electron to traverse its orbit."

Blewett, moreover, utilizes direct current to impart an axial component of motion to his particles in a direction parallel to his gaps and not across them, as he states further:

"Also a unidirectional potential is impressed between the electrode 12 and the electrode 13 for producing an axial field adapted to cause the electrons to move axially along the electrode system in the direction of the higher numbered electrodes."

In no sense does Blewett produce an acceleration of particles across gaps by the use of direct current alone, as I do, nor is Blewett able to do this in any manner whatsoever with the invention he discloses.

A device which does accelerate particles across a gap by the use of direct current alone is the "Ion Acclerating and Focusing System" of Yockey described in U.S. Patent No. 2,665,384. The construction disclosed by Yockey, however, accelerates in one gap and decelerates in the next. This has a practical application for use with a calutron for the mass separation of isotopes. It is entirely inapplicable to the accelerator art as practiced herein. The novel electrode arrangement of Yockey produces equipotential lines similar to those which I produce as shown below, but I achieve this by the novel circuit connection and tube and ring combination and in addition my ring performs the additional novel function of permitting parallel connections of electric source across a series of gaps which forms an important part of my invention as pointed out below. This, it is obvious, Yockey cannot do.

Other devices which utilize direct current for acceleration of charged particles are those of Kallmann (U.S. Patent No. 2,215,155) and Langmeir (U.S. Patent No. 2,880,337). Both of these utilize a series of gaps across which are imposed successive direct current differences of potential in series. This is old art and is described and distinguished from my invention with special reference to FIGS. 1, 1*a*, 1*b*, 1*c*, as explained below.

No existing devices or methods accomplish the acceleration of charged particles to high energies utilizing only direct current at relatively low differences of potential.

It is therefore a general object of this invention to provide a method and apparatus for the acceleration of any and all charged particles which would be free of all of the disadvantages of existing accelerators.

It is a primary object of this invention to provide an improved method and means of accelerating charged particles by the use of direct current accelerating potentials alone.

It is another object of this invention to provide a method and means of accelerating charged particles by direct current sources which would produce particles of higher energies than is now readily attained by existing methods and devices.

It is another object of this invention to provide a beam current of charged particles which would be greater at relativistic speeds than that attained by existing methods and devices.

It is yet another object of this invention to provide an apparatus for the acceleration of charged particles which would be small and inexpensive, thereby making it suitable for wide application in research and industry.

It is a more specific object of this invention to provide a method and apparatus which would economically improve the efficiency of the bevatron and similar machines.

It is still another specific object of this invention to provide an apparatus and a circuit whereby successive acceleration of particles across a multiplicity of gaps may be effected by the use of direct current sources alone, said sources being in parallel connection.

Other objects and advantages of this invention will become evident to those skilled in the art by reference to the following description and drawings of which:

FIG. 1 is a schematic diagram showing the principle of operation of a D.C.-Tron of the linear type.

FIG. 1*a* is a wiring diagram; illustrating an alternate means of operation.

FIG. 1*b* is a schematic diagram of a conventional linear accelerator using series D.C. connections across gaps.

FIG. 1*c* is a schematic diagram of a conventional linear accelerator using parallel D.C. connections across gaps.

FIG. 2 is a diagram illustrative of the basic principle of acceleration utilized in the D.C.-Tron.

FIG. 2*a* shows experimentally obtained equipotential lines in a D.C.-Tron accelerating gap.

FIG. 3 is a schematic diagram showing the principle of operation of a D.C.-Tron of the cyclic or arcuate orbit type.

FIGS. 3*a* and 3*b* are schematic diagrams of a bread board mock up of one embodiment of the invention.

FIG. 4 is one embodiment of a D.C.-Tron electric shielding tube and accelerator ring assembly.

FIG. 4a and FIG. 4*b* are improved configurations of the shielding and focusing arrangement shown in FIG. 4.

FIG. 5*a* and FIG. 5*b* are alternate methods of focusing a D.C.-Tron.

Figures 9, 11:
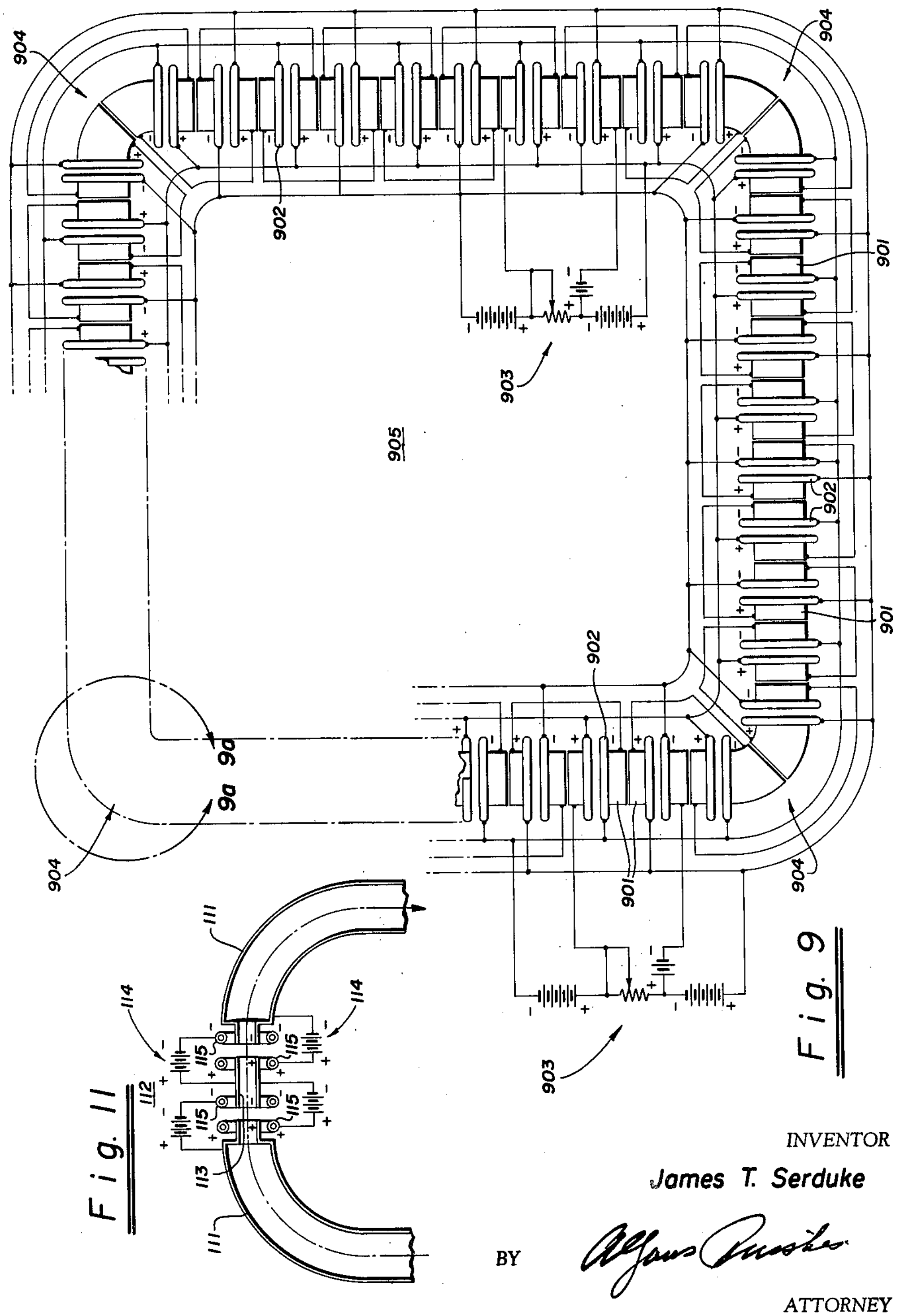
FIG. 9 is a D.C.-Tron of the cyclic type utilizing oval particle orbits.
Figures 9A, 9B:
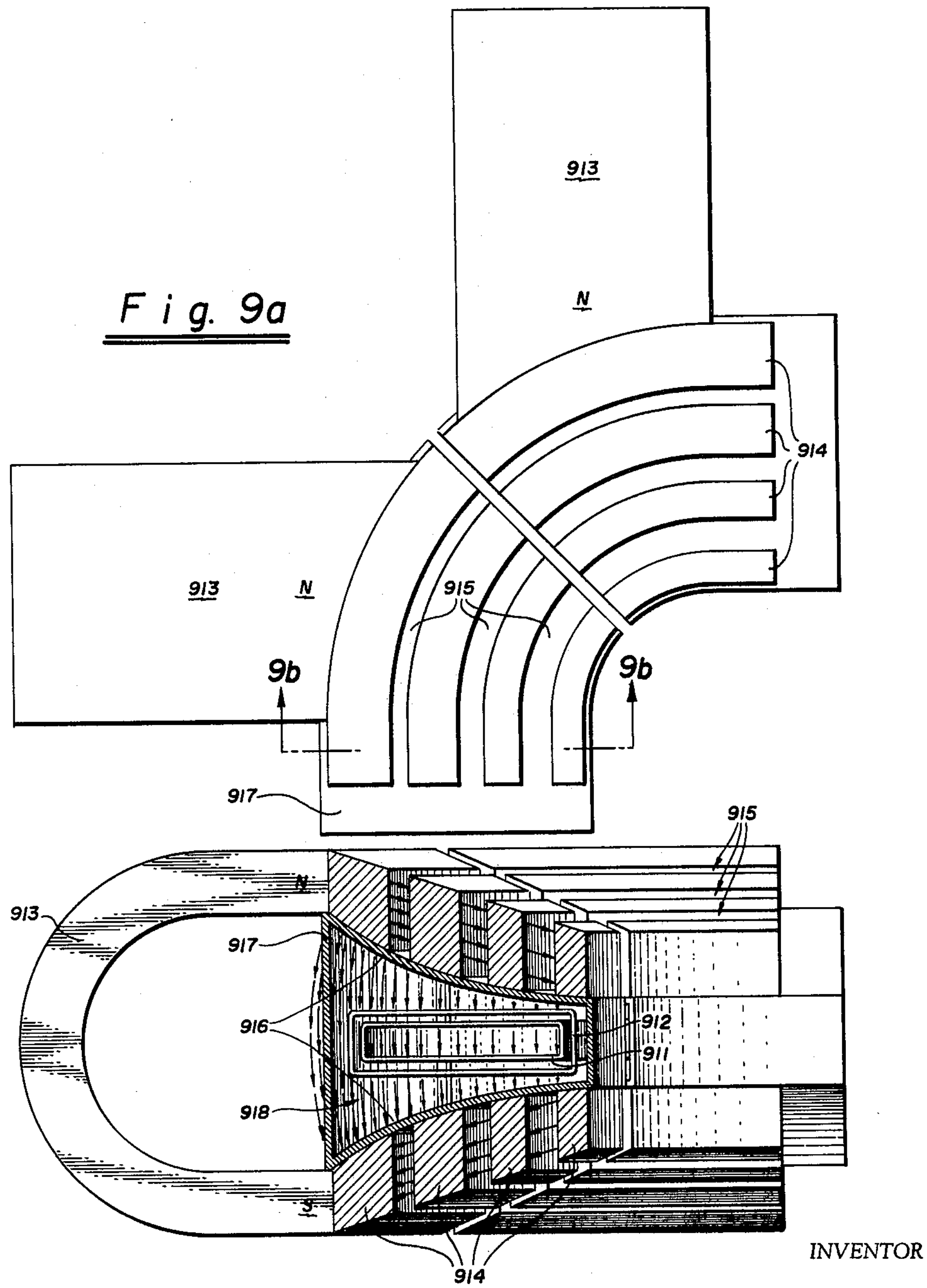

FIG. 9*a* and 9*b* are a plan and a sectional elevation of the particle turning guides used with the D.C.-Tron of FIG. 9.

Figure 10:
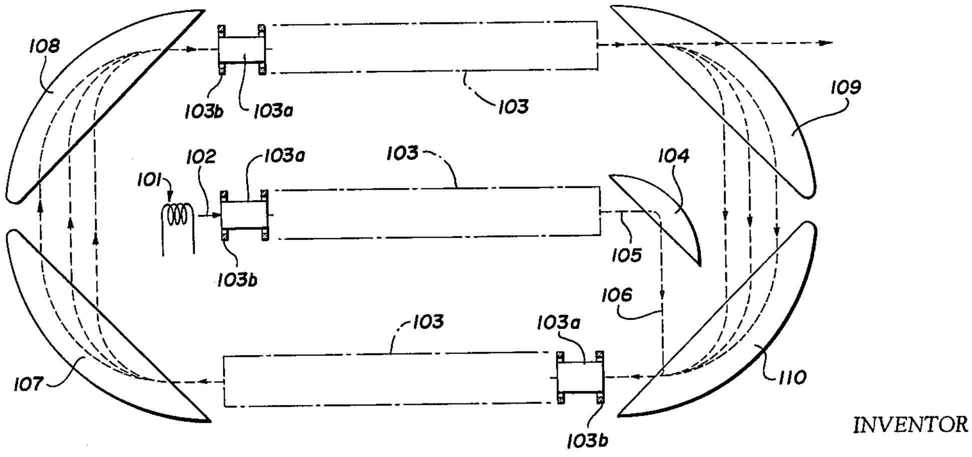

FIG. 10 is an alternate embodiment of a D.C.-Tron utilizing a combination of several linear accelerators and turning magnets.

FIG. 11 is an application of the D.C.-Tron principle to a bevatron.

Figure 12A:
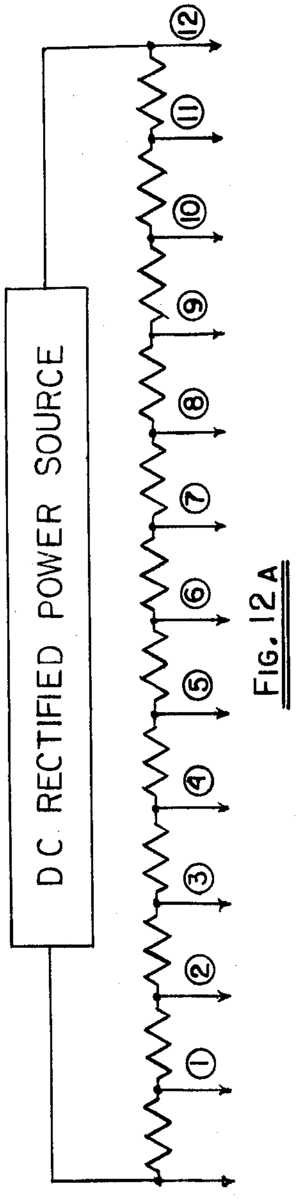
Figure 12:
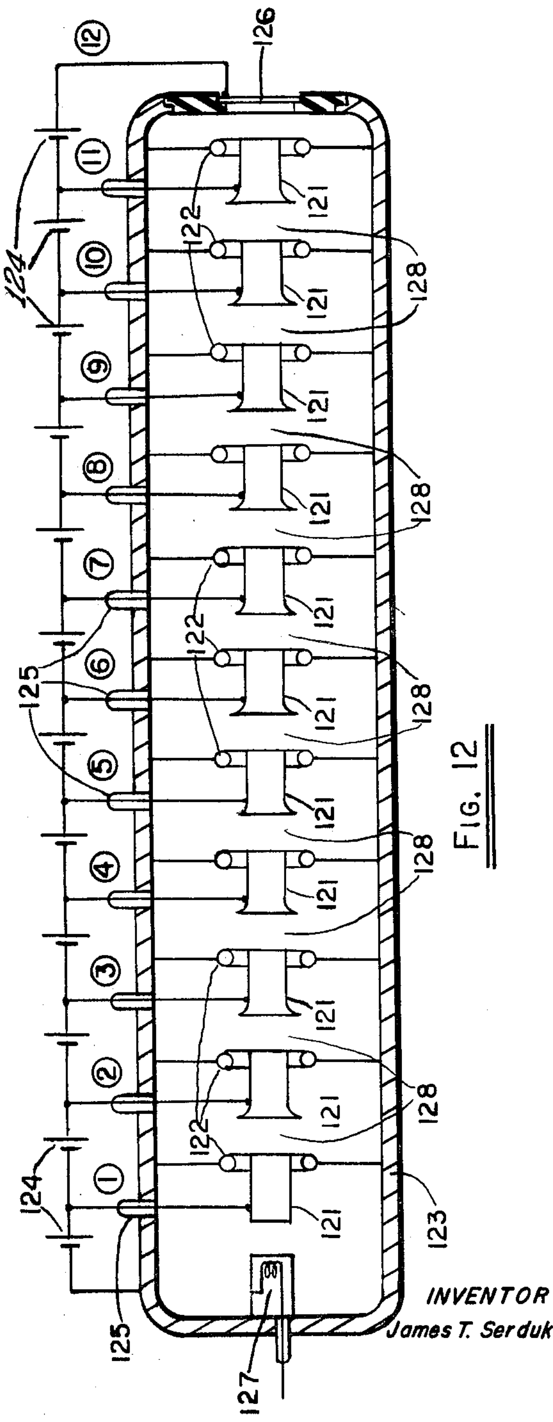

FIG. 12 is another embodiment of the D.C.-Tron method, which utilizes the same direct current electric source across a multiplicity of the accelerating gaps to obtain the energy of accelerated particles greater than the source used.

FIG. 12*a* is an alternate power source for FIG. 12.

Figure 13:
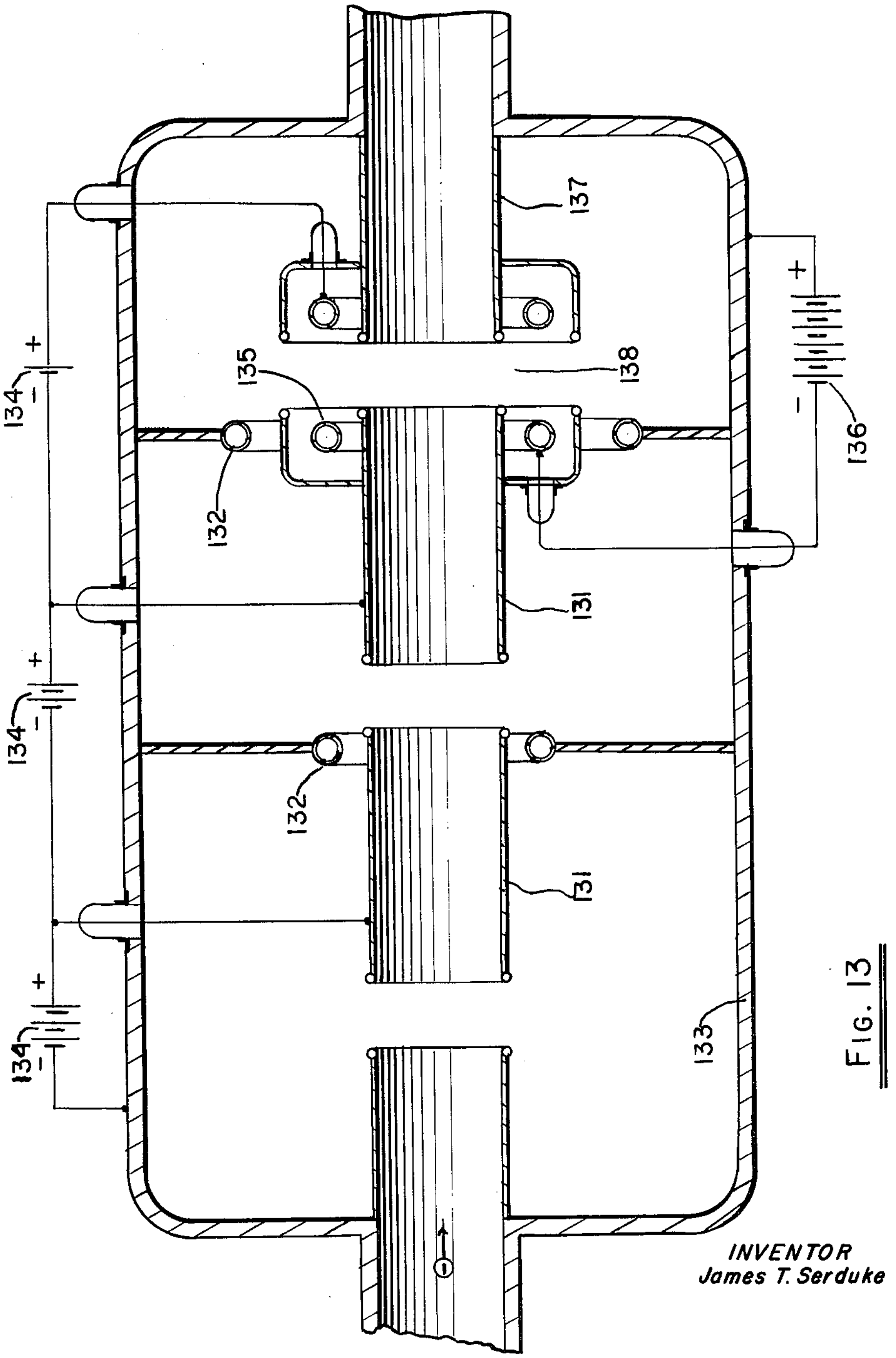

FIG. 13 is an adaptation of the embodiment of FIG. 12 to an orbital type machine.

Figure 1:
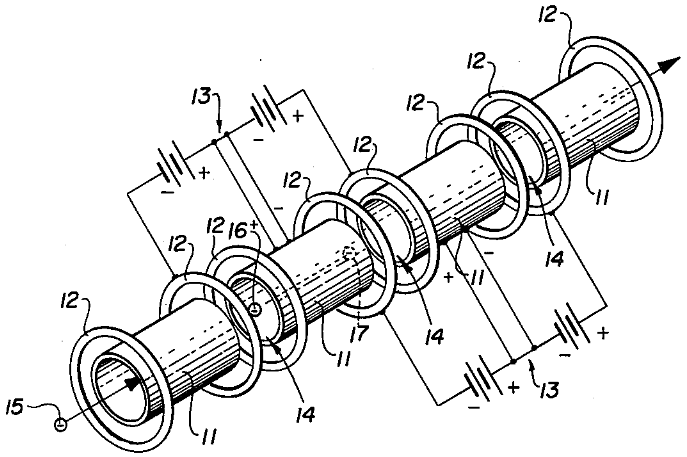

Referring now to the drawings and more particularly to FIG. 1, there are shown a series of electric shielding tubes 11, which may be of circular or other cross-section, through which the particles pass in an axial direction. Four tubes are shown in the diagram, but any number may be used. Positioned at either end of each electric shielding tube 11, but separated from it by a suitable electrically insulated space or vacuum, are the accelerator rings 12. A source of direct current potential 13 is connected to each electric shielding tube and accelerator ring as shown. Each electric shielding tube and its accompanying accelerator ring is separated from the adjacent one by a suitable gap 14, the size of which will depend on the potential supplied from 13. In an actual embodiment of a working device the electric shielding tubes are enclosed in a vessel or envelope which is evacuated to a high vacuum.

Figure 1A:
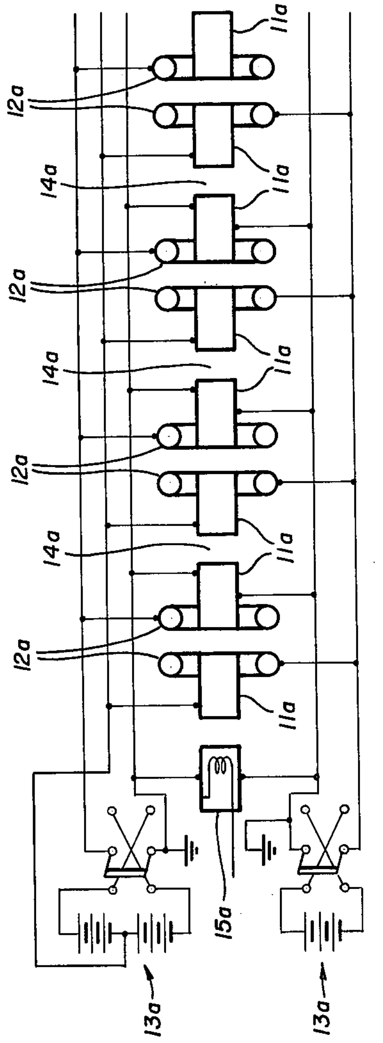

While I have shown an accelerator ring at each end of each shielding tube and such configuration is conducive to symmetry of construction, I have found that my invention will work if the accelerator rings are omitted from alternate gaps. This will still permit parallel connections of the direct current source to make possible multiple acceleration as described more fully below. Such a configuration is shown as FIG. 1*a* in which **11*a* represents the shielding tubes and 12*a* represents the accelerator rings. These are seen to be omitted at alternate gaps 14a. The corresponding wiring to the power sources 13*a* is as shown. The particle source is at 15*a***.

Assume that a particle with negative charge, such as an electron, is injected into the electric shielding tube 11, by means of a suitable injector (not shown). It will travel to the end of the first electric shielding tube at which point it will come under the influence of the combined effect of the electrical field created by the end of the electric shielding tubes 11 and the acceleration rings 12, the latter functioning as electrodes to assist the acceleration of particle 15 across gap 14 to a new position of increased energy at 16. The particle will then "coast" through the next electric shielding tube to position 17 where the process will be repeated.

A better understanding of the principle of the operation described above may be had from a consideration of FIG. 2 together with FIG. 1 and the description which follows.

Figures 2, 2A:
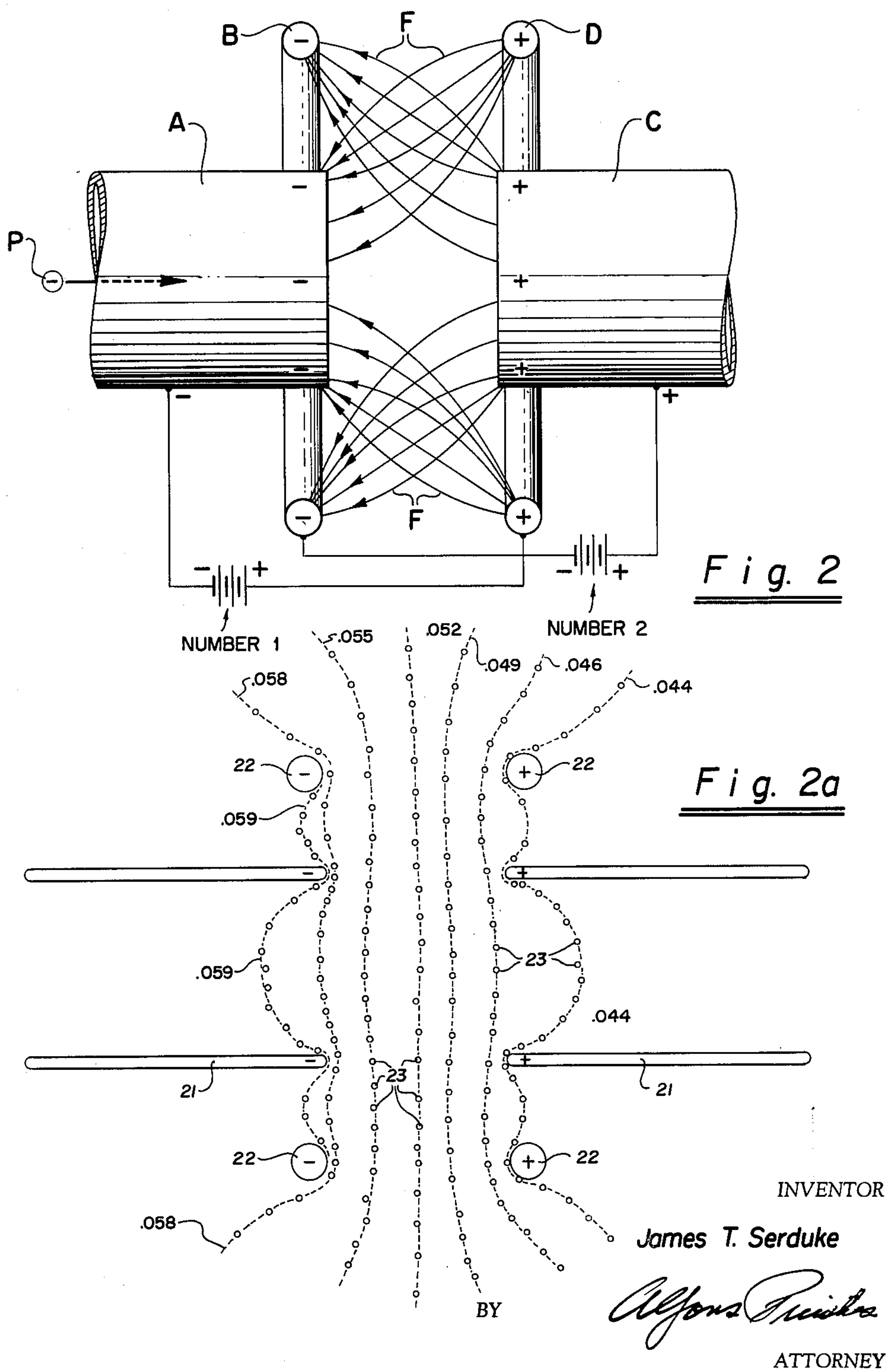

A correct understanding of the operation of this invention necessitates a complete understanding of the function of the accelerator rings 12 of FIG. 1 which are also designated as electrodes B and D of FIG. 2 and their relationship to the rest of the apparatus. These rings or electrodes perform the double function of assisting in the creation of a suitable electrical field as represented by the lines of force F of FIG. 2 as more fully described below, and also to permit the novel method of connecting sources of direct current or differences of direct current potential, in parallel across a multiplicity of accelerating gaps. The latter unusual feature enables this invention to effect the acceleration of charged particles across a multiplicity of gaps either in straight line or orbital paths, by the use of a number of parallel electrically insulated direct current power supplies of relatively small magnitude and all of which may be of the same magnitude.

Figures 1B, 1C, 3A, 3B:
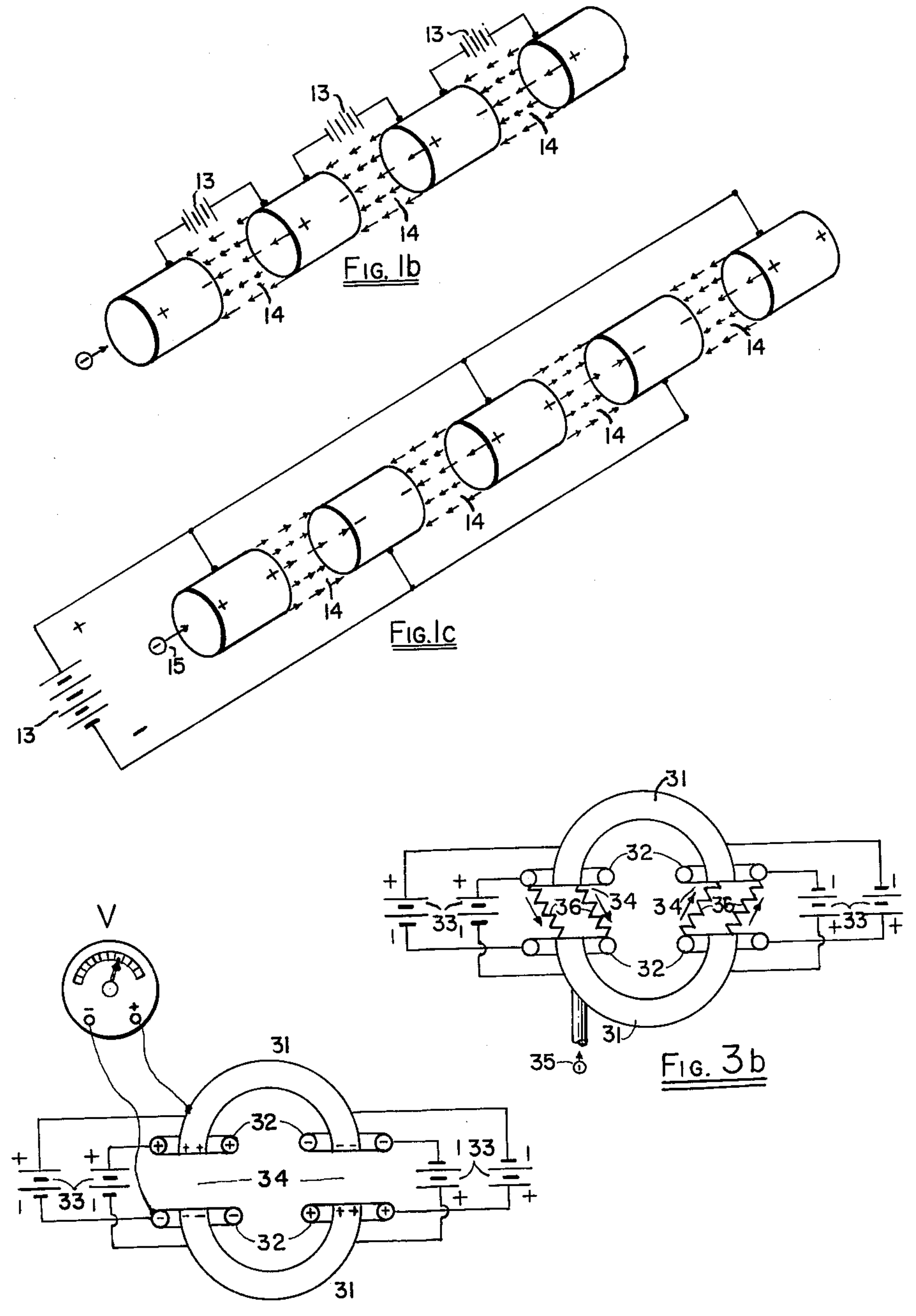

A clearer understanding of the functions of the accelerator rings may be had by a comparison of FIG. 1 with FIGS. 1*b* and 1*c*. In FIG 1*b* direct current differences of potential 13 are connected across successive gaps 14 in what amounts to a series connection. It is easily seen that under these conditions the accelerator will be operative and particle 15 will be accelerated. If the direct current difference potential 13 is connected across successive gaps in parallel as shown in FIG. 1*c*, we get successive acceleration and deceleration with a net of zero. If now I utilize the rings 12 of FIG. 1 for alternate connections across gaps I am able to effect parallel connections of two or more independent power sources across the gaps and still leave the accelerator operative. This is a novel feature which distinguishes my invention from all other accelerators using direct current.

What is even more important, the ability to make parallel connections, because of the accelerator rings, enables me to construct an accelerator in a closed loop configuration providing a repetitious orbital path for the particles as shown on FIG. 3 and described more fully below.

To those skilled in the art the soundness of my principle will be evident as follows. The increase or decrease in the speed of any electrically charged particle is caused by the electric field, only, which exists in the gap, or between the electrodes, at the time of passage by the particle. The magnetic field does not produce any change in the speed of the charged particle passing through it. The magnetic field produces or causes the change in the direction of the velocity possessed by the charged particle when it is passing through the field.

In order for the charged particle to get any increase in speed or be accelerated after passing through a succession or multiplicity of gaps or passing many times through the single gap or several gaps (like two gaps in the cyclotron), then the following two necessary conditions must exist or be present.

(1) At the time the charged particle comes out from the electric shielding tube, the electrode or electrodes with potentials on the opposite side of the gap must have a polarity opposite to the charge on the particle, and the polarity of the electrode or electrodes at the particle's exit from the electric shielding tube must be the same as the charge on the particle. (In conventional machines, with alternating high frequency potentials, this is accomplished by the synchronization of the particle's motion and the electric accelerating field.)

(2) In the closed path the combination of the multiplicity of accelerating electrodes, separated by the gaps, and the shielding tubes that will have the line integral of the electric intensity due to the direct current potentials along or around the particle's path must not be equal to zero, or symbolically written $$\oint E ds \neq 0$$

where:

E=the electric intensity

*ds*=the element of the particle path.

When inside the electric shielding tube the charged particle physically is not influenced by the electric field which is outside the same shielding tube in the case where it is correctly shielded. But when it comes to the exit end of the shielding tube the charged particle is influenced by the conditions of the electric field existing in the gap at the moment it is out of the electric shielding tube.

The law of conservation of energy, written in the following differential form:

$$\frac{d}{dt}\left(\frac{m_0c^2}{\sqrt{1-\frac{v^2}{c^2}}}+eV_0\right)=\frac{dV}{dt}$$

where:

$v$=the velocity of the particle
$e$=the charge on the particle
$c$=the velocity of light
$V$=the potential of the electric field shows that the increase in magnitude of the velocity can be expressed as the change in potential:

$$\Delta v=-e\left[\frac{1-\frac{v^2}{c^2}}{m_0v}\right]\Delta V$$

This equation shows that the existence of the difference of potential or potentials across the gap will cause a change in the velocity of the particle.

Refer now to FIG. 2 which shows that there exist the following potential differences:

(a) between electric shielding tube A with polarity minus and ring electrode D with polarity plus, created by potential source #1;
(b) between electric shielding tube C with polarity plus and ring electrode B with polarity minus, created by potential source #2.

Some of the theoretical electric lines of force F terminating on a metallic screen are shown in FIG. 2. In order to obtain theoretical equipotential lines one needs first to add vectorially the electric lines of force F and draw the resultant electric lines of force, then draw the perpendicular lines to the resultant electric lines of force, which are equipotential lines.

The electric field created in the gap of FIG. 2 by the two electric sources is such that it will accelerate charged particles, if they are negatively charged, from electrode pair A and B to electrode pair D and C along and parallel to the axis of the electric shielding tubes A and C in direction from A to C.

Experimentally obtained equipotential lines without metallic screens across tube A and tube C are shown in FIGURE 2A. These equipotential lines indicate that in the gap there is an electric field with a difference of potential that will accelerate, for example, negatively charged particles coming out from the electric shielding tube A in the direction of electric shielding tube C.

I have verified the combined effect of the electrostatic fields shown above by experimentally determining the location of equipotential lines which exist in and around the accelerating gap. These may be seen by reference to FIG. 2A. The opposite facing ends of two electric shielded tubes 21 were simulated as shown. Accelerating rings 22 were positioned as shown and potentials of the polarity shown were applied. Lines of equal potential 23 were determined with the aid of a galvanometer. The resultant effect is very similar to that obtained between the dees of the cyclotron of Lawrence (U.S. Patent No. 1,948,384) as described in Phys. Rev. vol. 53 pp. 408–420 for March 1, 1938. The added function of the accelerator rings 12 (or electrodes B and D) is now evident.

Any charged particle accelerator, be it cyclic or linear, including the D.C-Tron, must satisfy the condition that the line integral of the electric intensity along or around the particle's path must not be equal to zero. Symbolically written it is:
as shown above.

The main difficulties which are encountered in a charged particle accelerator utilizing direct current potential lie in the combination and the use of connections of accelerating potentials which do not permit the multiple or repeated use of accelerating potential or potentials or the formation of an arcuate path of accelerating gaps through which the particle could repeately pass and be accelerated and thus obtain a continuously additive increasing energy. In other words, any connections of existing accelerators in the form of the cyclic type using heretofore known configurations and circuitry utilizing direct current potentials must inevitably result in It should be evident to those skilled in the art that tremendous advantages are attained when the above D.C.-Tron principle is made to apply to an accelerator of the cyclic type such as those having arcuate orbits mentioned above or in some of the other embodiments disclosed herein in which the particle is made to retravel the same general orbit many times and/or make use of the same potential source connected in parallel across a multiplicity of gaps, to attain any desired energy.

Figure 3:
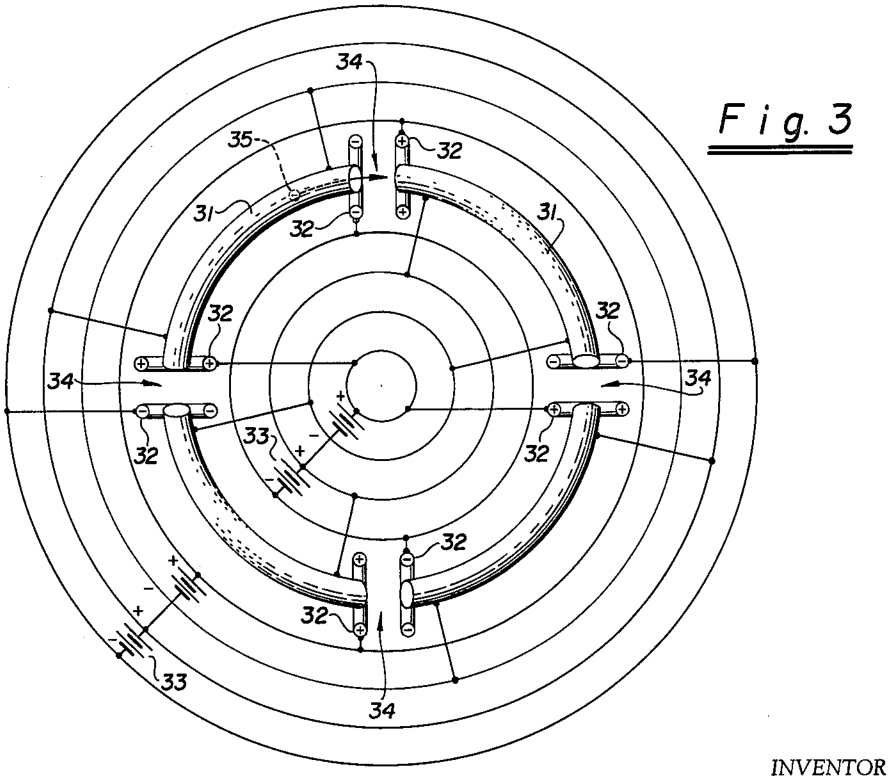

Such an embodiment is shown diagramatically in FIG. 3 to which reference is now made.

In the configuration shown, the electric shielding tubes 31 are arranged as arcs of a circle, although any other geometry which will produce a closed loop may be used. The accelerator rings 32 are positioned at either end of each electric shielding tube. Direct current potential sources are indicated at 33 and connected as shown. The gaps are shown at 34 across which in this particular case, the negative particle 35 is accelerated. Means of injection of the low energy particles and removal of high energy particles are not shown, as neither is the high vacuum envelope which customarily encloses the entire apparatus.

It is evidenced from the method and apparatus shown in FIG. 3 that the acceleration of the particles will be produced and the accelerator is therefore operative.

Utilizing the method shown in FIG. 3, a particle may be made to travel in a circular path indefinitely being accelerated as it crosses each gap and thereby particles may be readily and simply accelerated to relativistic velocities. It should now be obvious to those skilled in the art that the need for synchronizing, modulating, or otherwise varying the power supply is not present in the D.C.-Tron.

I have further verified the operativeness of my invention by constructing and testing a "bread board" mock up. This followed the general configuration shown in FIG. 3 except that for simplicity of construction only two curved sections 31 instead of four were used, thereby defining two gaps 34 as shown diagramatically in FIG. 3*a*. Four ordinary six volt dry cell batteries served as power sources 33 and were connected to the hollow copper tubes 31 and accelerator rings 32 as shown. A portable voltmeter V was used to determine the existence of differences of potentials in the system. Thus when the voltmeter terminals were placed so that one connected one end of tube 31 and the other the opposite accelerator ring as shown in the drawing a difference of potential was noted.

When the terminals were similarly placed across the opposite gap, the same but opposite direction potential was noted. No difference of potential was noted between opposite ends of the hollow tubes across the gap nor between adjacent accelerator rings, nor between an adjacent tube end and accelerator ring. Thus there is experimental verification of the existence of such differences of direct current potential as has been explained more fully above.

Reference should now be had again to FIGS. 2 and 2*a* and the accompanying explanation which shows how such differences of potential produce an accelerating field across a gap and the experimental corroboration thereof. It should now be evident to those skilled in the art that since the connection to direct current sources of my accelerator rings and tubes will produce the accelerating electric fields across a gap and since my accelertaor rings permit a circuitry for parallel connection which can supply the required differences of potential, then it follows that my device is operative to accelerate charged particles.

Referring now to FIG. 3*b* which is again a schematic diagram of my bread board mock up described above, the jagged lines 36 between the rings and the shielding tubes represent ohmic resistances or what correspond to electrical loads on the system. The arrows indicate the direction of current in those resistors. Since the direction of current in any ohmic resistance is the indicator of the direction of the electric field produced by electric sources causing the flow of current, then this physical fact can be taken as the indicator of the direction of the electric fields in the D.C.-Tron gaps without presence of the resistors.

For a final and complete understanding of the principle of operation of my invention and how the latter is consistent with, but a novel improvement over, present learning in the art, it is necessary to distinguish between pure electrostatic and time independent non-electrostatic electromotive force acceleration. This is explained quite well by Donald H. Menzel in "Fundamental Formulas of Physics" (Prentice Hall, Inc. 1955) pages 571, 572 and 573 from which the following is quoted:

"4. *Particle acceleration*

The agency for accelerating particles in all types of accelerators consists of properly applied electric fields. The electric fields employed may be either static, quasistatic, or time-varying. Acceleration processes may be divided into two classes according to whether the particle is continuously accelerated or whether the accelerating takes place in discrete steps of an impulsive character. The former is employed in linear accelerators of the Cockcroft-Walton, Van de Graaf, and traveling-wave types, and in the betatron, while the latter is employed in the cyclotron, synchrocyclotron, synchrotron, and their variants, as well as in linear accelerators employing drift tubes.

"4.1 Electrostatic and quasi-electrostatic acceleration. In the Van de Graaf accelerator, the charged particles are accelerated by falling through an electrostatic potential difference of magnitude corresponding to the final energy of the particles. This method requires the establishment over some linear region of very high potential differences. The same type of acceleration process is used in Cockcroft-Walton machines except that the potential difference is an alternating one of such low frequency that the particles undergo the complete acceleration process before the potential has changed sign. The practical difficulties of establishing and maintaining large potential differences limits present application of these methods to energies up to about 5 Mev.

* * * * *

"4.4 Impulsive acceleration. When acceleration of particles is obtained by allowing them to pass once or repeatedly through one or more regions in which alternating electric fields are established, one has a process of impulsive acceleration. This type of acceleration is used both in circular accelerators and in linear accelerators. As in traveling wave acceleration, it is possible for the particles to pass through the alternating fields at such times as to be decelerated rather than accelerated. Again certain conditions of 'phase stability' must be met in order that particles be eventually accelerated to high energies, or the acceleration process must be terminated before the particles reach decelerating phases. In general, all employed types of impulsive acceleration can, to a good approximation for theoretical study of the phase stability problem, be replaced by an equivalent traveling wave acceleration in which the successive impulsive accelerations are smoothed out into an equivalent continuous acceleration."

The more important aspects of my discovery for acceleration of charged particles with direct current sources may be summed up as follows:

(a) The novel circuitry for connecting two or more independent (by word independent meaning electrically insulated from each other) direct current electric sources to shielding tubes and electrically insulated rings or short tubes at each end of these shielding tubes and concentric with them, which constitute the electrodes for the accelerating gaps to produce the accelerating electric fields;

(b) The utilization of the rings to produce the polarized shielding tubes;

(c) The use of multiplicity of the electric fields in each accelerating gap produced by the independent direct current sources;

(d) The novel circuitry of parallel connection of two or more independent direct current sources to the multiplicity of the accelerating gaps.

Specific embodiments of the D.C.-Tron method will now be described. In order for any particle accelerator to function satisfactorily it is necessary that the line of travel of the particles be properly confined or focused. This may be done by either electrostatic or magnetic means or a combination of both. The D.C.-Tron method lens itself especially well to several different means and methods of focusing which form an important part of this invention.

Figure 4:
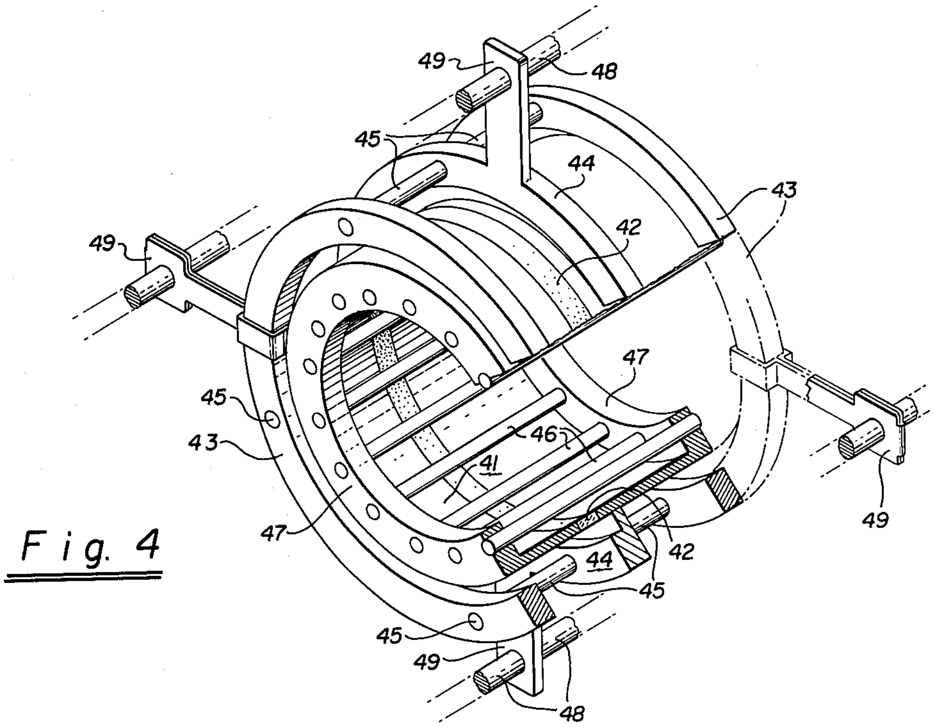

Referring now to FIG. 4, which is a preferred embodiment of an electric shielding tube and accelerator ring assembly, 41 is the main electric shielding tube shell which may be made of aluminum or other material having a high electrical conductivity. The shell 41, is split vertically into two horizontal sections by the space 42 which is filled with a material having a high electrical resistance or electric insulating material and suitable for use in a high vacuum. The accelerator rings or electrodes 43 are separated from each other and from the tube 41 and from the conductor ring 44, the latter being concentrically positioned and electrically connected to shell 41, by means of insulating spacers 45 which are made of material having properties similar to those used in the space 42. Conductor bars 46, made of a material having a high electrical conductivity, such as aluminum or copper, are arranged in the form of a squirrel cage positioned inside the electric shielding tube shell 41, each bar being connected to opposite end ring 47 of the electric shielding tube 41. A D.C. potential from a source not shown is supplied through buss bars 48 and terminals 49 to the conductor ring 44 and electric shielding tube shell 41 respectively. A further D.C. potential from a source not shown, is supplied to accelerator rings 43 through terminals 49.

A number of the assemblies shown in FIG. 4 may be arranged in series inside a vacuum envelope, connected as shown in FIG. 1 and made to function as a linear particle accelerator. The conductor bars 46, arranged in a squirrel cage pattern inside the electric shielding tube provide a magnetic field between the squirrel cage and the inside diameter of the tube, and thus serve to focus or prevent the particles traveling in a beam along the axis of the tube from striking or impinging upon the electric shielding tube.

Figure 4A:
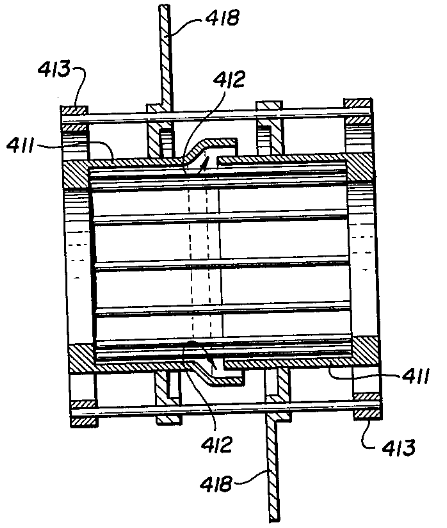
Figure 4B:
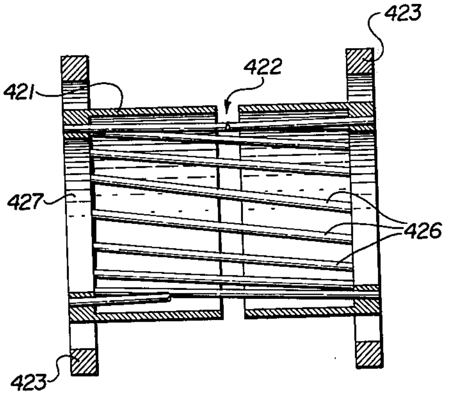

Several modifications in configuration to improve focusing and shielding may be utilized. Thus referring to FIG. 4*a*, the space 412 in electric shielding tube shell 411 may be formed by overlapping the two halves of shell 411, as shown, thus insuring maximum effectiveness of the electric shielding. Referring to FIG. 4*b*, the conductor bars 426 are disposed at an angle to the electric shielding tube shell 421 in order to minimize probability of collision with the conductor bars by particles traveling along the axis of the tube.

Figure 5A:
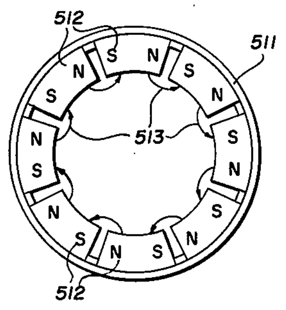
Figure 5B:
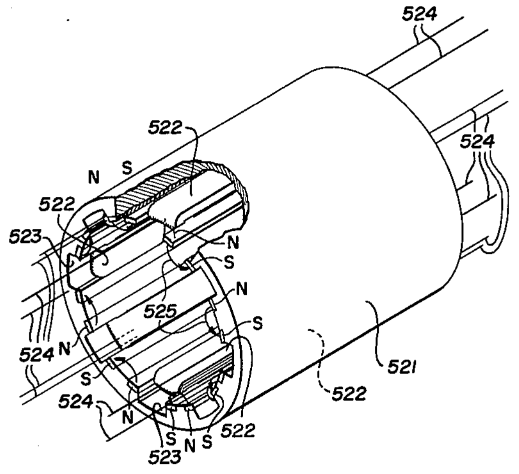

Referring now to FIG. 5*a* and FIG. 5*b*, there are shown two alternate methods of focusing which may be employed with the D.C.-Tron instead of the squirrel cage arrangement shown in FIG. 4. In FIG. 5*a* there is shown positioned around the inside circumference of the electric shielding tube shell 511 a series of small permanent magnets 512 having alternate north and south magnetic polarities. These produce magnetic lines of force 513 along the circumference and perpendicular to the motion of the accelerated particles. They create the magnetic field required for focusing. In FIG. 5*b* there are positioned in suitable slots 523 in the electric shielding tube shell 521 a series of coils 522 supplied by a source of D.C. potential (not shown) through terminals 524 and so wound as to produce the alternate north and south magnetic poles. These produce the magnetic lines of force 525 creating the required focusing field.

Figure 6:
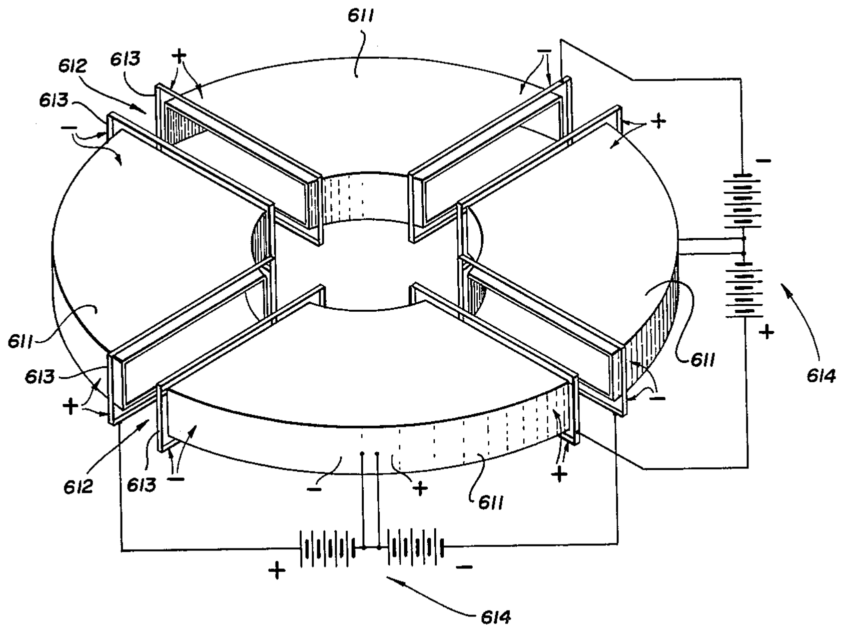
FIG. 6 is a schematic diagram of a D.C.-Tron of the cyclic type utilizing circular particle orbits.

Referring now to FIG. 6, there is shown schematically a D.C.-Tron of the cyclic type using a circular particle orbit. The electric shielding tubes 611 are generally in the shape of segments of a hollow pill box, positioned to form a circular particle path with gaps 612. The accelerator rings 613 are of generally rectangular shape, positioned at the end of, and insulated from each electric shielding tube. A charged particle or ion source and method of removing high energy particles, as well as a high vacuum envelope (all not shown), are provided. A method of turning the particles in spiral orbits by means of magnets located above and below the electric shielding tubes 611 (also not shown) is utilized.

Those skilled in the art will recognize the similarity in appearance of the above configuration of a D.C.-Tron to the cyclotron of Lawrence, but utilizing a radically different principle of operation characterized, among other things, by the dependence on a D.C. potential alone, and by requiring no synchronization of the particle motion and the accelerating electric field, and enabling the use of a multiplicity of accelerating fields in excess of the two used in conventional cyclotrons.

Figures 7A, 7B:
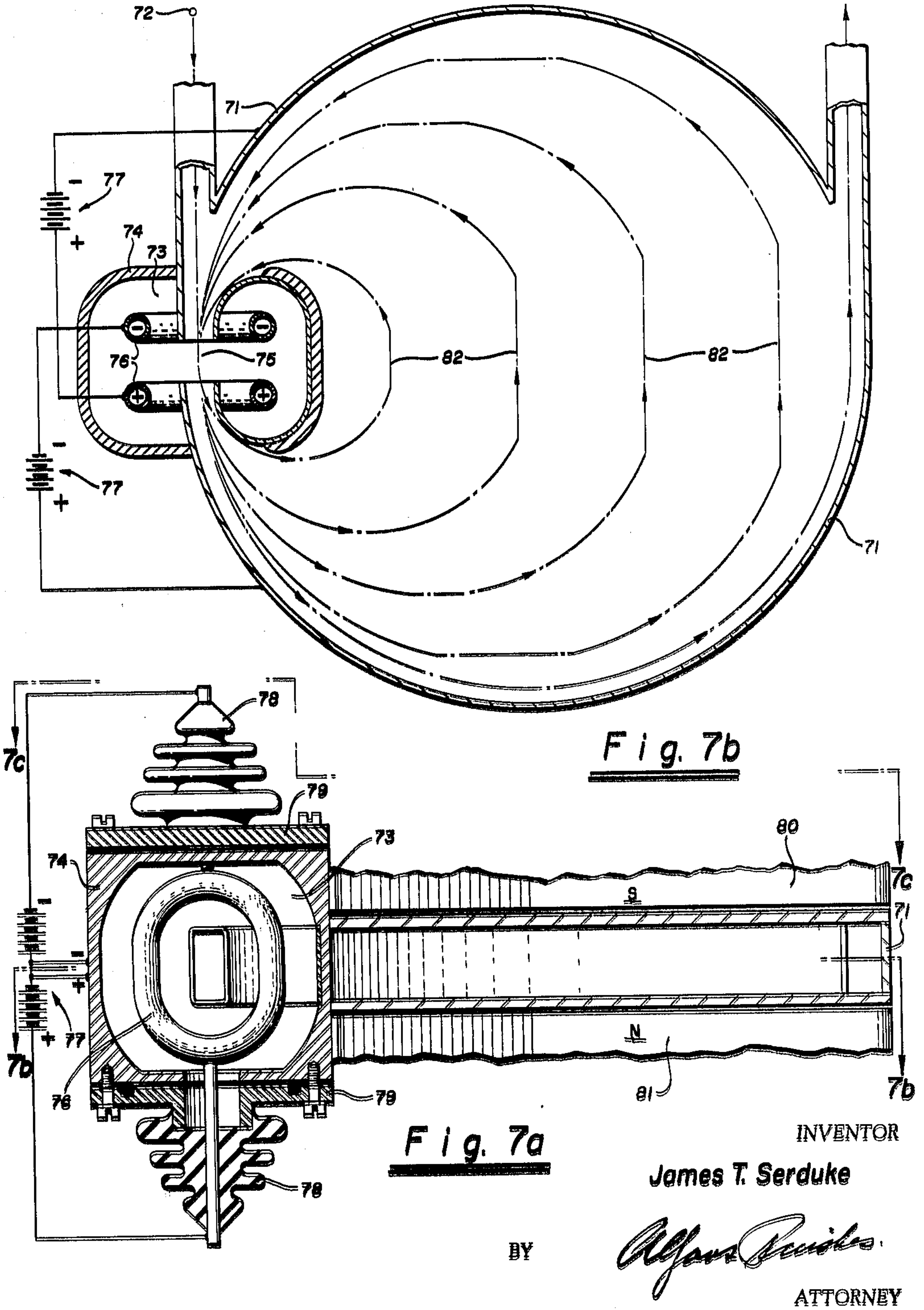
FIG. 7 (*a*, *b*, *c*), is a series of views of a D.C.-Tron of the cyclic type utilizing tangential particle orbits.
Figure 7C:
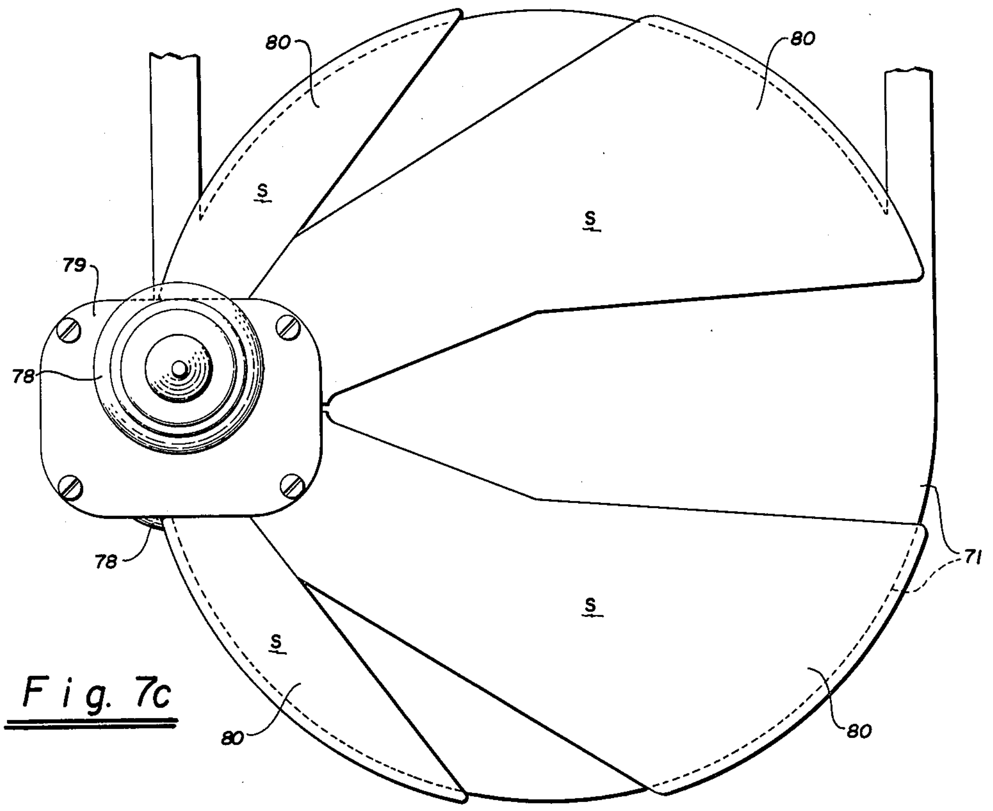

Referring to FIG. 7, there is shown schematically several views of the D.C.-Tron of the cyclic type using tangential particle orbits. FIG. 7*a* is a cross-section through the D.C.-Tron along its greatest dimension and FIG. 7*b* is a section along line B—B. FIG. 7*c* is a plan view the upper pole face. A beam of particles 72 is injected into the D.C.-Tron housing 71 which is made of a material having a high electrical conductivity and is evacuated to a high vacuum. The housing 71 is shaped to provide a recess space 73 encased in housing 74 and forming accelerating gap 75. Accelerator rings 76 are positioned at opposite ends of gap 75 and inside recess space 73. A source of D.C. potential is connected through insulators 78 to accelerator rings 76 and housing 71. Removable cover plates 79 are positioned on housing 71 to provide access to recess space 73. Magnets 80 and 81 positioned on either side of housing 71 effect necessary focusing and cause particles to travel in the orbital paths 82 which are tangent to each other at the gap 75 where they are accelerated in passage across the gap as described above. FIG. 7*c* shows a configuration of the top pole piece which will produce the orbital path shown in FIG. 7*b*.

Figure 8:
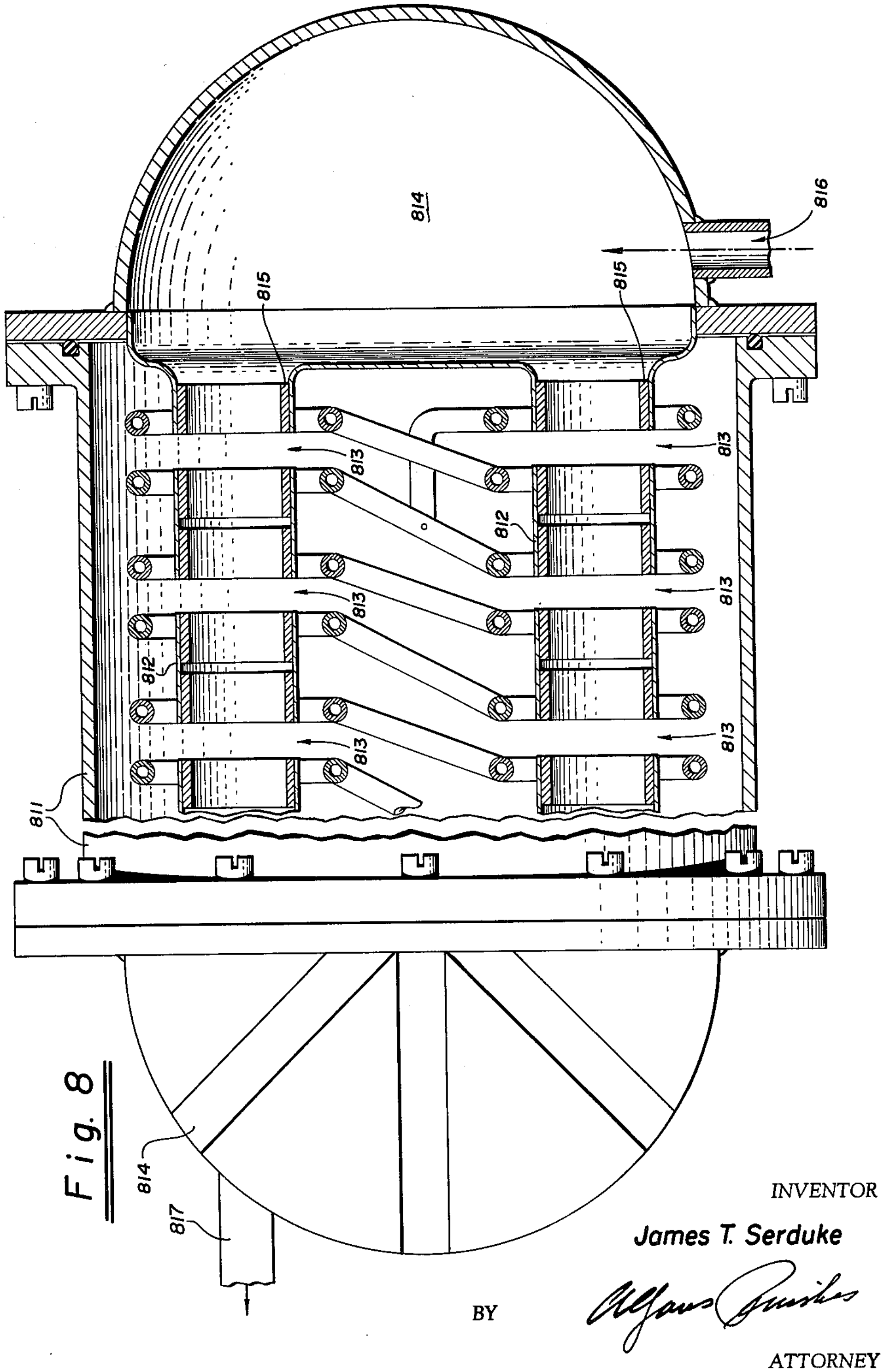
FIG. 8 is a view, partly in section, of a D.C.-Tron of the linear type arranged for cyclic operation.

Referring to FIG. 8 which shows a linear accelerator, of the D.C.-Tron type arranged for cyclic operation, the apparatus is enclosed in housing 811 which is evacuated to a high vacuum. The electrical shielding tube and accelerator ring assemblies 812 which may be of the type described above and shown in FIG. 4, are positioned inside housing 811 in two parallel rows and spaced to provide gaps 813. Turning chambers 814 located at opposite ends of the rows of electric shielding tubes 812 and connected to the end of the electric shielding tubes 815 of each row, serve to provide a path for turning the particles through an angle of 180° while traveling from one row of electric shielding tubes to the other. The actual turning of the particles is effected by a magnetic field supplied from magnets (not shown) located outside of the turning chambers 814. A beam of particles 816 may be injected by means of a suitable injector (not shown) and ejected in a beam 817 by a suitable ejector (also not shown) after attaining any desired energy acquired by repeated travel through the two series of accelerating electric fields created by the D.C.-Tron method as illustrated in the apparatus disclosed above.

Refer now to FIG. 9 which shows a D.C.-Tron which provides a particle path that is generally oval in shape similar to that found in the bevatron. I have found that this configuration may be used to produce charged particles, especially electrons, of high energy in an apparatus which is much smaller and lighter (and hence cheaper) than any now in use. The electric shielding tube shells 901 may be of the general construction shown in FIG. 4, but for this embodiment I prefer an oval or elliptical rather than a circular cross-section in order to have smaller gaps between magnetic poles. The accelerator rings 902 are connected to sources of D.C. potential in a manner similar to that shown in FIG. 3. Turning guides 904 at each corner which serve to turn the particles through 90° are shown in more detail in FIG. 9*a*.

Referring now to FIG. 9*a*, there is shown a plan and sectional elevation of one of the turning guides 904 of FIG. 9. The magnets 913 are positioned against guide shoes 914 which are made of a material having high magnetic permeability, such as soft iron. The guide shoes 914 are spaced to provide particle channels 915 which increase in cross-section as the distance from magnets 913 increase, in order to increase the reluctance of the magnetic path, thereby decreasing the number of magnetic flux lines across the inner channels between the magnetic poles. The guide shoe support chamber 917 is made of a non-magnetic material such as aluminum or magnesium alloy. The magnetic flux density 918 is greatest at the outer radius of the turning guide where the particle velocity is the highest decreasing towards the center. This is accomplished by the spaces 915 in the pole pieces as described above The electric shielding tube 911 and accelerator ring 912 are positioned inside the guide shoe support chamber 917. The tapered space 916 provides bowed magnetic flux lines with a component perpendicular to the motion of the particles and thus causing focusing of the particles passing through the magnetic field.

It should be obvious to those skilled in the art that by utilizing the construction shown above, I am able to focus charged particles traveling in an arcuate path in proportion to their requirements based on particle velocities and thus prevent inefficiencies of the machine caused by phase instability, defocusing, loss of particles, etc. I am thus able to accomplish in this novel and simple manner what has been attempted by other focusing methods, notably that taught by McMillan in his cloverleaf cyclotron, U.S. Patent No. 2,872,574 issued February 3, 1959.

Referring now to FIG. 10, there is shown an embodiment of a D.C.-Tron utilizing a combination of several linear accelerators and turning magnets to produce a compact unit. The linear accelerators 103 are comprised of a series of electric shielding tubes 103A and accelerating rings 103B of the general type disclosed herein. A particle injector 101 injects particles into the center accelerator at 102. After passing through the first accelerator 103 they pass through the first turning magnet 104 at 105 and then follow path 106 through the second accelerator 103 and through turning magnets 107 and 108 into a third accelerator 103 and thence through turning magnets 109 and 110.

Referring now to FIG. 11, there is shown an application of the D.C.-Tron principle to a bevatron with two curved sections 111 shown. In the straight section 112 there is inserted in place of the conventional drift tube connected to a radio-frequency oscillator, the electric shielding tube 113 connected to a direct current supply source 114. The accelerator rings 115 are positioned and connected as shown. While I have shown the power supply 114 schematically as a battery, actually I prefer a high voltage source of supply such as a rectified alternating current supplying a D.C. potential of the order of 15,000 volts.

It will be obvious to those skilled in the art that the foregoing modifications may be economically made to existing bevatrons at a relatively small cost compared to the initial cost of a bevatron which is of the order of ten million dollars ($10,000,000.00).

With the D.C.-Tron type accelerating field in the bevatron, there would be no rejection of any particles, therefore, the number of particles accelerated would be more than six times the number of particles accelerated by the conventional machine. This is neglecting any other unforseen causes of particle loss, such as particle scatter. The acceptance factor of the D.C.-Tron accelerating unit would be several times that of the present RF unit.

The use of the D.C.-Tron accelerating field in the bevatron as shown in FIG. 11 will lead to the following advantages:

(1) Fully applied (i.e., 15,000 volts per gap or total of 30,000 volts for two gaps) voltage of the accelerating electric field will be imparted to the energy of the accelerated particles for each traversal, instead of a small fraction of the accelerating electric field now available for use in the bevatron.

(2) A D.C.-Tron accelerating unit installed in a bevatron will reduce to 207,000 the number of revolutions to be made by the accelerated protons to acquire an energy of 6.2 Bev. in comparison with 4,100,000 revolutions the accelerated protons must make in the bevatron to acquire the same energy of 6.2 Bev. using RF oscillating electric field to impart the acceleration.

(3) There will be no requirement that the accelerated particles enter the electric accelerating field of the D.C.-Tron within a limited phase interval.

(4) There will be no rejection of the injected particles by the D.C.-Tron accelerating field.

(5) It will not be necessary that the period of acceleration be equal to the time it takes an accelerated particle to traverse a single revolution in the bevatron.

(6) Since there will be no rejection of the charged particles by the D.C.-Tron accelerating electric field, the number of accelerated particles will increase by a factor of six or more making the present bevatron and similar installations more useful in high energy physics applications as the result of a change to the D.C.-Tron method of particle acceleration.

(7) A multiplicity of the D.C.-Tron accelerating electric field units can be used to accelerate charged particles (electrons, protons, etc.,) in the bevatron without creating the synchronization problem and the other operational difficulties. The use of multiple D.C.-Tron accelerating electric fields will reduce still further the number of revolutions the protons would have to make to acquire an energy of 6.2 Bev. and thus cause a reduction in the time of acceleration of the particles with a resultant increase of the operating efficiency, versatility, and maximum beam current output in present equipment.

In the embodiments shown herein, a minimum of four separate power sources are shown to supply the difference of potential across each gap; that is, from one shield tube to the accelerator ring on the opposite side of the gap. I have found that any number of shield tube and accelerator ring combinations may be supplied by connecting them in parallel to the same four power sources. Thus, for example, in a linear accelerator of any length, cumulative acceleration of charged particles may be effected by utilizing parallel connections from the same potential source across succeeding gaps when using the method of D.C.-Tron connection disclosed herein.

The basic D.C.-Tron principle disclosed above makes possible still another embodiment which offers unusual advantages in certain applications. It makes it possible to connect a series of shield tubes and accelerating electrodes with a direct current power source so that the accelerated energies at each gap are added in arithmetic or geometric progression, or other progressive combinations.

Referring now to FIG. 12, the shield tubes 121 and accelerator rings 122 are shown positioned in an evacuated chamber 123 to which the accelerator rings 122 are connected so as to be at the same potential. This may be grounded if desired. Power sources 124 are connected through insulators 125 to the shield tubes 121, to each other, to the chamber 123 and a target or window at the end of the accelerator 126 in a series-parallel arrangement as shown. A charged particle source is shown at 127. Acceleration of the particles is effected successively across the gaps 128 or in the other D.C.-Tron configuration described herein above. With the power sources 124 connected as shown, however, the energy imparted to the particles as they cross each gap is not increased by the same increment each time but by a continuously increasing increment of voltage as they move toward the target because they are being subjected to a higher and higher difference of potential from the increasing number of series connected power sources which supply each successive gap.

For example, if in the embodiment shown, each of the power sources were of the magnitude of one thousand volts, then an electron would be accelerated to one thousand electron volts across the first gap. At the second gap it would be subject to a difference of potential of two thousand volts, so that its resultant energy after it crossed the second gap would be one thousand plus two thousand equals three thousand electron volts. At the third gap it would be one thousand plus two thousand plus three thousand equals six thousand electron volts. For the twelve gaps shown, the final energy of the particle would be seventy-eight thousand electron volts, although the twelve original power sources of one thousand volts each would total only twelve thousand volts when connected in series.

Stated algebraically $$Vt=\frac{n}{2}(V_o+V_s)$$

where $V_t$=final energy at the target
$n$=number of gaps
$V_o$=voltage across each gap
$V_s$=sum of the voltage across all gaps.

The tremendous advantage of such an embodiment of the D.C.-Tron principle is obvious to anyone familiar with high voltage applications.

FIG. 12*a* shows an embodiment using sources of rectified D.C. power as power sources for the configuration of FIG. 12.

Referring now to FIG. 13, the shield tubes 131 and accelerator rings 132 are positioned in an evacuated chamber 133 and connected to the power sources 134 as in the previous configuration. Here, however, an additional pair of accelerator rings 135 are supplied by a separate power source 136 connected as shown and positioned on opposite sides of gap 138. With this arrangement it is possible to connect a number of chambers such as that shown in FIG. 3 by means of suitable modifications of exit tube 137 to form an orbital path accelerator such as a bevatron. The conventional D.C.-Tron accelerating gap 138 will permit such an arrangement to satisfy the basic requirements for D.C.-Tron operability as hereinabove described.

The power sources 134 need not be of equal magnitude but may be varied to achieve any desired result.

While certain preferred embodiments of this invention have been disclosed, it will be apparent to those skilled in the art that many modifications may be made in the form and combination disclosed herein, within the spirit and scope of this inventiton and without departing therefrom. I do not, therefore, desire to limit this invention to the details herein described and shown, except as specifically covered by the claims.

I claim:

1. The method of aceclerating charged particles comprising the steps:
 injecting said particles into a direct current electric field across a gap;
 subjecting said particles to the accelerating effect of a difference of direct current potential across said gap;
 supplying said difference of potential from two independent direct current sources.

2. The method of accelerating charged particles comprising the steps:
 injecting said particles into a direct current electric field across a gap;
 subjecting said particles to the accelerating effect of a difference of direct current potential across said gap;
 deflecting the motion of said particles by the action of a magnetic field;
 causing said particles to travel in orbital paths repeatedly across said gap;
 supplying said difference of potential from two independent direct current sources, to effect cumulative acceleration of said particles;
 and ejecting said particles from said direct current electric field and from said magnetic field.

3. The method of claim 1 comprising the additional steps of:
 causing said particles to travel through a multiplicity of said electric fields and gaps;
 shielding said multiplicity of fields from one another.

4. The method of claim 2 comprising the additional steps of:
 causing said particles to travel through a multiplicity of said electric fields and gaps;
 shielding said multiplicity of fields from one another.

5. Apparatus for accelerating charged particles comprising a hermetically sealed and evacuated housing and further comprising:
 means for injecting said particles into said apparatus;
 a plurality of gaps, said gaps comprising successive spaces between the ends of a plurality of hollow tubes in concentric axial alignment with each other;
 means for applying differences of direct current potential across said gaps;
  each of said gaps being supplied by two independent sources of direct current, electrically insulated from each other;
  said gaps and said differences of potential combining to form an electrical field across said gaps;
 means for electrically shielding said gaps from one another;
 means for causing said particles to travel in straight line paths;
 means for ejecting said particles from said apparatus.

6. The apparatus of claim 5 in which said particles are caused to travel in orbital paths repeatedly across said gaps.

7. Apparatus for accelerating charged particles comprising a hermetically sealed and evacuated housing and a means for injecting said charged particles into said apparatus, and further comprising:
 electrode means;
  said electrodes being spaced apart and positioned so as to define a gap therebetween;
 means of introducing charged particles to one side of said gap;
 means of applying differences of direct current potential from separate sources electrically insulated from each other across said gap;
 means of electrically shielding said differences of potential to define an electrical field in said gap,
 whereby said field produces an acceleration of said particles across said gap.

8. The apparatus of claim 7 in which said differences of potential are of different intensities.

9. Apparatus for acceleration of charged particles comprising a hermetically sealed and evacuated housing and a means for injecting said charged particles into said apparatus and further comprising:
 opposing hollow tubes,
  said tubes being positioned with their hollow portions facing each other and spaced apart to define a gap therebetween;
 accelerating electrodes positioned at each end of said tubes;
 sources of direct current potential applied to each of said tubes, and to each of said electrodes;
  said potentials being such that each end of said tubes is of the same polarity as the said accelerating electrode positioned at its end but of a polarity opposite to that of the tube and the electrode on the opposite side of said gap;
  said sources of direct current potential being such that a difference of potential is maintained between each end of said tubes and the opposite electrode;
  said tubes being disposed so that their hollow portions form an orbital path for said charged particles;
 means for causing said particles to travel in said orbital path to effect cumulative acceleration of said particles.

10. Apparatus for accelerating charged particles comprising a hermetically sealed and evacuated housing and a means for injecting said particles into said apparatus, and further comprising:
 a first hollow tube;
 a second hollow tube;
  said second hollow tube being positioned with its hollow portion facing the hollow portion of said first hollow tube;
  said first and second tubes being spaced so as to define gaps adjacent to their ends;
 an accelerating electrode positioned at each end of said first tube and at each end of said second tube;
 a first source of direct current potential;
 a second source of direct current potential;
 a third source of direct current potential;
 a fourth source of direct current potential;
  said first source of potential connected across one end of said first hollow tube and the accelerating electrode on the opposite side of the adjacent gap;
  said second source of potential connected across the other end of said first hollow tube and the accelerating electrode on the opposite side of the adjacent gap;
  said third source of potential connected across one end of said second hollow tube and the accelerating electrode on the opposite side of the adjacent gap;
  said fourth source of potential connected across the other end of said second hollow tube and the accelerating electrode on the opposite side of the adjacent gap,
 whereby differences of potential are maintained across said gaps.

11. In an apparatus for acceleration of charged particles of the class described the improvement comprising:
 a series of opposing hollow shielding tubes; said shielding tubes being positioned with their hollow portions facing each other and spaced apart to define a series of gaps between said shielding tubes;

means for establishing a difference of direct current potential across the ends of each of said shielding tubes which define every alternate one of said gaps;

accelerating electrodes positioned at one end of each of said shielding tubes on opposite sides of every other alternate one of said gaps;

means for establishing a difference of direct current potential across one end of each of said shielding tubes and the electrode on the opposite side of each of said every other alternate gap;

means for injecting charged particles into said shielding tubes; a hermetically sealed and evacuated housing for enclosing said shielding tubes, said gaps, and said electrodes.

12. The improved apparatus of claim 11 in which said hollow shielding tubes are positioned to form an orbital path for said charged particles;

means for causing said particles to travel in said orbital path to effect cumulative acceleration of said particles.

13. Apparatus for accelerating charged particles of the class described comprising:

a plurality of opposing hollow shielding tubes;

said shielding tubes being positioned with their hollow portions facing each other and spaced apart so as to define gaps therebetween;

accelerating electrodes positioned at one end of each of said shielding tubes and on opposite sides of every alternate one of said gaps;

sources of direct current potential applied to each of said shielding tubes and to each of said electrodes;

said potentials being such that each end of said shielding tubes is of the same polarity as the said accelerating electrode positioned at its end but of a polarity opposite to that of the shielding tube and the electrode on the opposite side of said gap;

said source of direct current potentials being further such that a difference of potential is maintained between each end of said shielding tubes on opposite sides of said gaps, and between each end of said shielding tubes and the opposite electrode;

said shielding tubes being disposed so that their hollow portions form an orbital path for said charged particles;

means for injecting charged particles into said apparatus;

means for causing said particles to travel in said orbital path to effect cumulative acceleration of said charged particles;

means for ejecting said particles from said apparatus;

housing means for hermetically enclosing said apparatus.

14. Apparatus for accelerating charged particles of the class described comprising a hermetically sealed and evacuated housing and further comprising:

a first hollow shielding tube;

a second hollow shielding tube;

said second hollow shielding tube being positioned with its hollow portion facing the hollow portion of said hollow shielding tube;

said first and secand shielding tubes being spaced so as to define a gap adjacent to their ends;

accelerating electrodes positioned at one end of said first shielding tube and at one end of said second shielding tube on opposite sides of said gap;

a first source of direct current potential;

a second source of direct current potential;

a third source of direct current potential;

said first source of direct current potential connected across one end of said first hollow shielding tube and the accelerating electrode on the opposite side of the adjacent gap;

said second source of direct current potential connected across the end of said second hollow shielding tube and the accelerating electrode on the opposite side of the said adjacent gap;

said third source of direct current potential connected across the other end of said first and said second tube, whereby differences of direct current potential are maintained across said gaps;

means for injecting charged particles into said apparatus;

means for ejecting said particles from said apparatus.

15. In an apparatus for acceleration of charged particles of the class described comprising a hermetically sealed and evacuated housing and a means for injecting said particles into said apparatus and further comprising:

a plurality of opposing hollow tubes;

said tubes being positioned in series with their hollow portions facing each other and spaced apart to define a series of gaps therebetween;

accelerating electrodes positioned at one end of each of said tubes on one side of each of said gaps;

means for maintaining differences of direct current potential across said gaps;

the improvement in which:

said differences of potential are connected in series with each other;

said electrodes are connected to a common terminal;

whereby the effective accelerating potential across each gap increases progressively at each successive gap in said series.

References Cited by the Examiner

UNITED STATES PATENTS

| | | | |
|---|---|---|---|
| 2,215,155 | 9/1940 | Kallman | 328—233 X |
| 2,880,337 | 3/1959 | Langmuir et al. | 328—233 X |

GEORGE N. WESTBY, *Primary Examiner.*

DAVID J. GALVIN, *Examiner.*